(12) United States Patent
Gerrard

(10) Patent No.: US 7,506,882 B2
(45) Date of Patent: Mar. 24, 2009

(54) MOTOR-VEHICLE INDEPENDENT SUSPENSION

(75) Inventor: Miles Barnaby Gerrard, Turin (IT)

(73) Assignee: Sistemi Sospensioni S.p.A., Corbetta (Milan) (IT)

( * ) Notice: Subject to any disclaimer, the term of this patent is extended or adjusted under 35 U.S.C. 154(b) by 0 days.

(21) Appl. No.: 10/554,111

(22) PCT Filed: Apr. 21, 2004

(86) PCT No.: PCT/IB2004/001196

§ 371 (c)(1),
(2), (4) Date: Aug. 31, 2006

(87) PCT Pub. No.: WO2004/094169

PCT Pub. Date: Nov. 4, 2004

(65) Prior Publication Data

US 2006/0290091 A1 Dec. 28, 2006

(30) Foreign Application Priority Data

Apr. 22, 2003 (IT) .......................... TO2003A0313

(51) Int. Cl.
*B60G 3/04* (2006.01)
(52) U.S. Cl. .................... 280/124.134; 280/124.145
(58) Field of Classification Search .......... 280/124.134, 280/124.135, 124.137, 124.139, 124.141, 280/124.143, 124.145, 124.117, 124.128, 280/124.111

See application file for complete search history.

(56) References Cited

U.S. PATENT DOCUMENTS

| 4,181,189 | A | | 1/1980 | Hobbensiefken |
|---|---|---|---|---|
| 6,123,351 | A | * | 9/2000 | Bruehl ................. 280/124.135 |
| 6,267,526 | B1 | | 7/2001 | McLaughlin |
| 6,719,314 | B1 | * | 4/2004 | Schote ................. 280/124.135 |
| 6,752,409 | B1 | * | 6/2004 | Kunert ................. 280/124.138 |
| 7,150,462 | B2 | * | 12/2006 | Bortz et al. ........... 280/124.125 |
| 7,258,355 | B2 | * | 8/2007 | Amano ................. 280/124.134 |

FOREIGN PATENT DOCUMENTS

| EP | 0 135 857 A | 4/1985 |
|---|---|---|
| EP | 0 262 661 A | 4/1988 |
| JP | 58 141 907 A | 8/1983 |
| JP | 02 099 415 A | 4/1990 |
| JP | 02 216 309 A | 8/1990 |
| JP | 07 186 649 A | 7/1995 |
| JP | 09 095 113 A | 4/1997 |

* cited by examiner

*Primary Examiner*—Faye M. Fleming
(74) *Attorney, Agent, or Firm*—Sughrue Mion, PLLC

(57) ABSTRACT

The suspension comprises a first, a second and a third rod-like connection member (10, 11, 12), each of which has a first (22, 13, 15) and a second point of articulation (23, 14, 16) to the wheel-carrier (1) and to the vehicle structure, respectively, and is arranged to control one degree of freedom of translation (t, t1, t2) along an axis (y, y1, y2) substantially passing through its own points of articulation. The first connection member (10) is arranged to control also a degree of freedom (r1) of rotation about its own axis (y) and a degree of freedom (r2) of rotation about a direction (z) substantially perpendicular to its own axis (y).

11 Claims, 4 Drawing Sheets

FIG. 1
FIG. 2
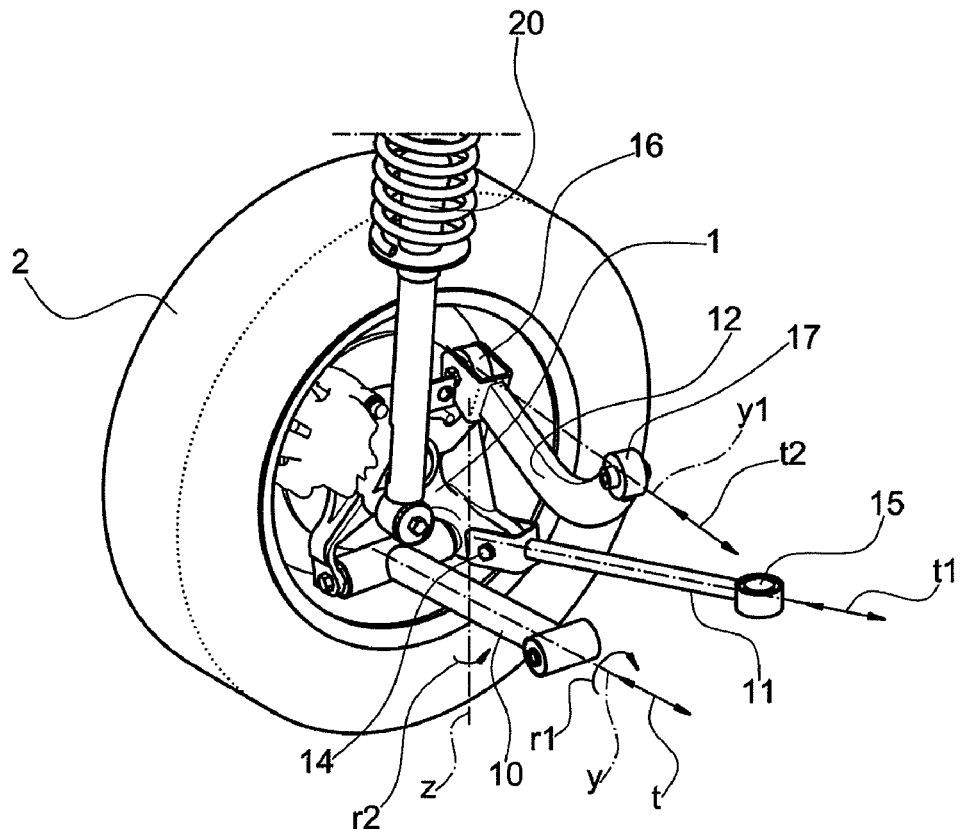
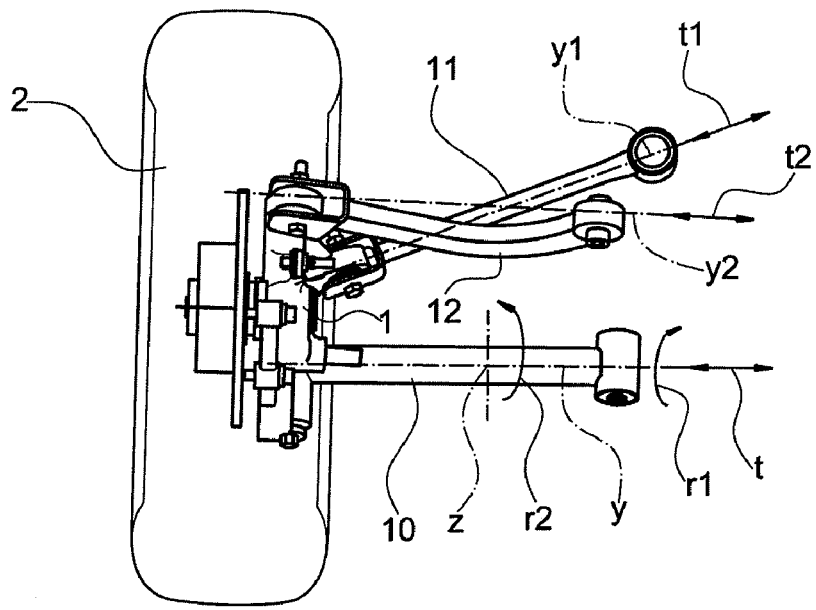

1

MOTOR-VEHICLE INDEPENDENT SUSPENSION

This is a National Stage entry of International Application PCT/IB2004/001196, with an intenational filing date of Apr. 21, 2004, which was published as WO 2004/094169 A1, and the complete disclosure of which is incorporated into this application by reference.

BACKGROUND OF THE INVENTION

The present invention relates to an independent suspension for a motor-vehicle.

In independent suspensions for motor-vehicles it is known the use of rod connection members which are articulated at their ends to the wheel-carrier and to the vehicle structure and are capable of eliminating only one degree of freedom, that is to say, the degree of freedom of translation along the axis of the rod. A typical example of application of rod-like connection members is provided by multi-link suspensions. This type of suspension ensures high elasto-kinematic performances, but has the drawback of considerably higher manufacturing costs than simpler suspension architectures.

SUMMARY OF THE INVENTION

It is therefore the object of the present invention to provide an independent suspension for a motor-vehicle which is structurally simple but ensures high elasto-kinematic performances.

This object is fully achieved according to the invention by virtue of an independent suspension for a motor-vehicle having the characteristics defined in the first independent claim. Further advantageous characteristics of the suspension are specified in the dependent claims.

In short, the invention is based on the idea of providing an independent suspension for a motor-vehicle comprising three rod connection members, each of these members having at one end a first single point of articulation to the wheel-carrier and at the opposite end a second single point of articulation to the vehicle structure and being arranged to control one degree of freedom of translation along its own axis; the suspension being also arranged to control the remaining two degrees of freedom of the wheel-carrier by virtue of the torsional stiffness of at least one of the rod connection members about its own axis and about a direction substantially perpendicular to its own axis.

According to a preferred embodiment of the invention, forming object of claim 2, a first rod-like connection member is arranged to control three degrees of freedom of the wheel-carrier, that is to say, the degree of freedom of translation along its own axis and the two degrees of freedom of rotation about its own axis and about a direction perpendicular to its own axis, whereas the other two rod-like connection members are each arranged to control only the degree of freedom of translation about its own axis.

The invention will be described in greater detail hereafter, purely by way on non-limiting example, with reference to the appended drawings, in which:

DETAILED DESCRIPTION OF THE DRAWINGS

FIG. 1 is a perspective view of an independent suspension for a motor-vehicle according to the invention;

FIG. 2 is a plan view of the suspension of FIG. 1;

DETAILED DESCRIPTION OF THE INVENTION

Figure 3:
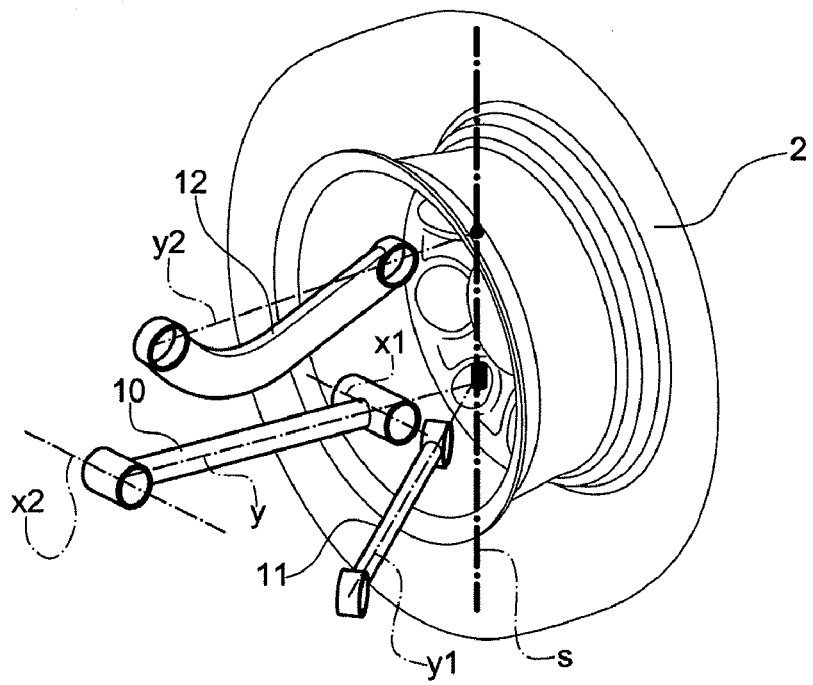
FIGS. 3 to 5 are perspective views of the suspension of FIG. 1, which show the elasto-kinematic behaviour thereof.

In the description and the claims which follow, terms such as "longitudinal" and "transverse", "vertical" and "horizontal", "front" and "rear" are to be intended as referred to the mounted condition on the vehicle. Moreover, the expression "axis of the rod connection member" is intended as the direction substantially passing through the points of articulation of the member.

Referring first to FIGS. 1 and 2, a independent suspension for connecting a wheel-carrier 1 of a wheel 2 of a motor-vehicle, in particular a non-steering wheel, to the structure of the motor-vehicle (not shown) basically comprises three rod connection members, indicated 10, 11 and 12, respectively. Each of the three rod-like connection members 10, 11 and 12 is provided at its ends with a first and a second single point of articulation to the wheel-carrier 1 and to the vehicle structure, respectively, and is arranged to control the degree of freedom of translation along its own axis, that is, along the direction substantially passing through its own points of articulation.

As will be described in detail further on, in the embodiment shown in FIGS. 1 and 2 the first rod connection member 10 is arranged to control three degrees of freedom of the wheel-carrier 1 (two rotational degrees of freedom in addition to the translational degree of freedom), whereas the second and the third connection member 11 and 12 are each arranged to act as a simple connecting rod which controls the sole degree of freedom of translation along its own axis, wherein the expression "controlling a degree of freedom" is to be intended in the sense of providing a stiffness high enough to allow considerably smaller displacements in the direction of the controlled degree of freedom than those allowed in the other directions In the suspension shown in FIGS. 1 and 2, the second rod connection member 11 is articulated at one end thereof in a first point 14 to the wheel-carrier 1 and at the opposite end in a second point 15 to the vehicle structure and acts as a longitudinal rod. The third rod connection member 12 is articulated at one end thereof in a first point 16 to the wheel-carrier 1 and at the opposite end in a second point 17 to the vehicle structure and acts as a camber control rod. The first rod connection member 10 is used, together with the longitudinal rod 11, to restrain a lower portion of the wheel-carrier 1, whereas the camber control rod 12 is articulated to an upper portion of the wheel-carrier 1. Moreover, a spring-damper assembly 20 without structural function is interposed between the wheel-carrier 1 and the vehicle structure.

Figure 6:
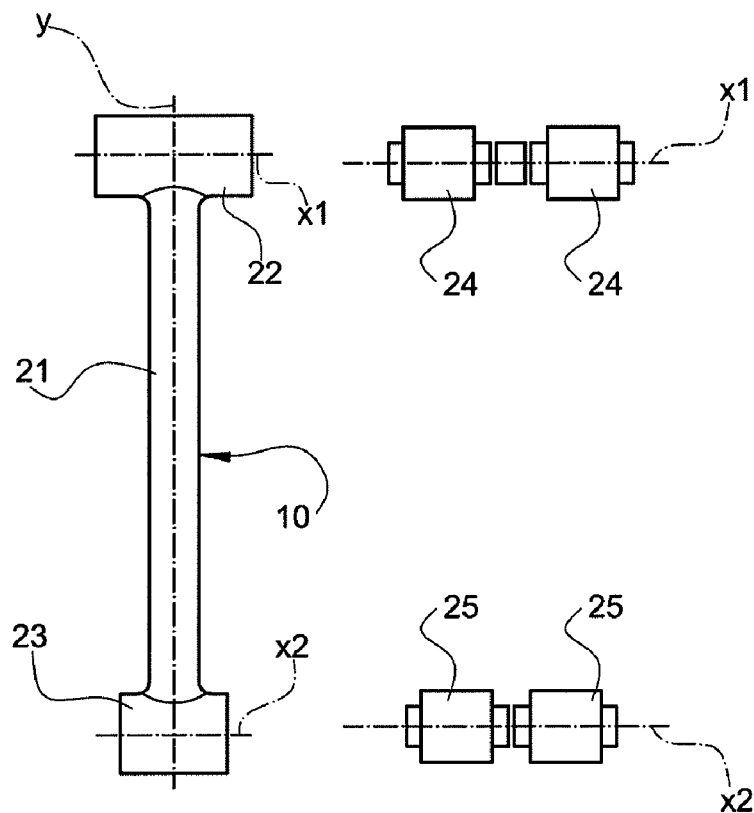
FIG. 6 is an exploded plan view of a rod connection member for the suspension of FIG. 1.

In FIG. 6 there is illustrated in detail the first rod connection member 10, which comprises an elongated rigid central body 21, having for example a cylindrical tubular structure, to the inner and outer ends of which are attached, for example by welding, cylindrical seats 22 and 23 intended to receive the bushes for articulation to the wheel-carrier 1 and to the vehicle structure, respectively. According to a first embodiment (FIG. 6), the outer seat 22 receives a first pair of bushes 24 for articulation to the wheel-carrier 1 about a first axis x1, whereas the inner seat 23 receives a second pair of bushes 25 for articulation to the vehicle structure about a second axis x2. Preferably, though not exclusively, the axes x1 and x2 are arranged on planes perpendicular to the axis of the body 11, indicated y, whereby the connection member 10 has a double-T shape in plan view. Advantageously, the ratio between the longitudinal size of the connection member (that is to say, along the direction of the axis y of the body 21) and its transverse size (that is to say, along the directions of the axes x1 and x2) is at least 3.

Figure 7:
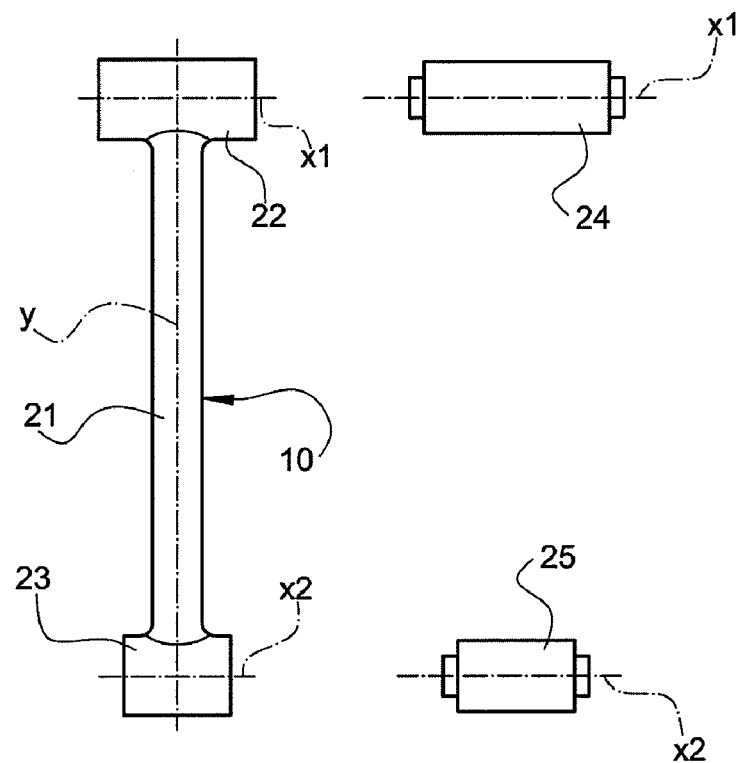
FIG. 7 is an exploded plan view of a constructional variant of the rod connection member of FIG. 6.

According to a variant of construction, shown in FIG. 7, each pair of bushes 24, 25 of the first rod connection member 10 may be replaced by one elongated bush. However, it is clearly possible to provide for a higher number of bushes received in the seats 22, 23 of the member 10.

As previously mentioned, the first rod connection member 10 is capable of controlling, in addition to the degree of freedom t of translation along its own axis y (which in this case corresponds to the geometrical axis of its own body 21), one first further degree of freedom r1 of rotation about the axis y (torsion), since torques applied on the wheel about directions perpendicular to those of the axes x1, x2 (as a result of the breaking forces, for example) are transmitted by the cylindrical seats 22, 23 to the body 21 in the form of torsional rsional stresses, which the body 21 can oppose by virtue of its own to stiffness. The rod connection member 10 is also capable of controlling, by virtue of its own bending stiffness, one second further degree of freedom r2 of rotation about a direction z substantially perpendicular to the axis y.

The two degrees of freedom r1 and r2 are to be intended as "elastic", rather than strictly kinematic, degrees of freedom, since they are not defined by a geometrical constraint, as the translational degree of freedom t along the axis y is on the contrary, but they are defined by the elastic characteristics of the connection member 10.

The longitudinal rod 11 controls the degree of freedom t1 of translation along the direction of its own axis y1 connecting the points of articulation 14 and 15, whereas the camber control rod 12 controls the degree of freedom t2 of translation along the direction of its own axis y2 connecting the points of articulation 16 and 17.

A suspension architecture of the type described above is therefore capable of controlling five degrees of freedom altogether by using only three rod connection members, instead of the five members required in a traditional multi-link system.

The use of a rod connection member according to the invention enables also to create a suspension system with a controlled compliance, that is, a system capable of withstanding specifically to forces applied in different points and acting in different directions. In order better to understand this aspect of the invention, the concept of shear axis will be introduced by referring to FIGS. 3 to 5. The shear axis of a generic compliant system can be defined as the axis about which the system has a torsional stiffness far smaller than that about other directions perpendicular thereto. The shear axis can thus be regarded as the locus of the points of greatest translational stiffness with respect to forces applied perpendicularly to that axis.

Figure 4:
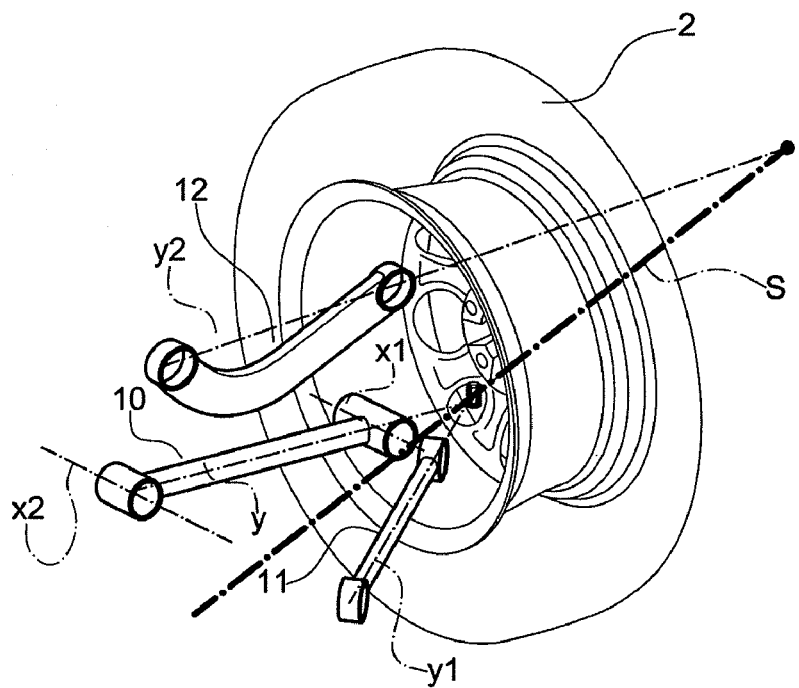

The geometrical construction of the shear axis s of the suspension is shown in FIG. 3 in the theoretical case in which the rod connection member 10 is infinitely rigid under torsion about its own axis y. As a result of the translational stiffness of the three rod connection members 10, 11 and 12, the shear axis s must intersect the axes y and y1 of the members 10 and 11, respectively, as well as the axis y2 of the member 12. Moreover, as a result of the torsional stiffness of the first rod connection member 10, the shear axis s must be perpendicular to the axis y of the latter. Displacements about the shear axis s are controlled by the stiffness of the first connection member 10 with respect to the direction corresponding to the above-defined degree of freedom r2.

Actually, since the first connection member 10 is not infinitely rigid under torsion, the shear axis s is not perpendicular but inclined to the axis y (FIG. 4), even though it has to intersect the axis y1 of the longitudinal rod 11 and the axis y2 of the camber control rod 12, in addition to the above-mentioned axis y. The inclination of the shear axis s can be defined at the design stage by properly setting the torsional stiffness of the connection member 10.

Figure 5:
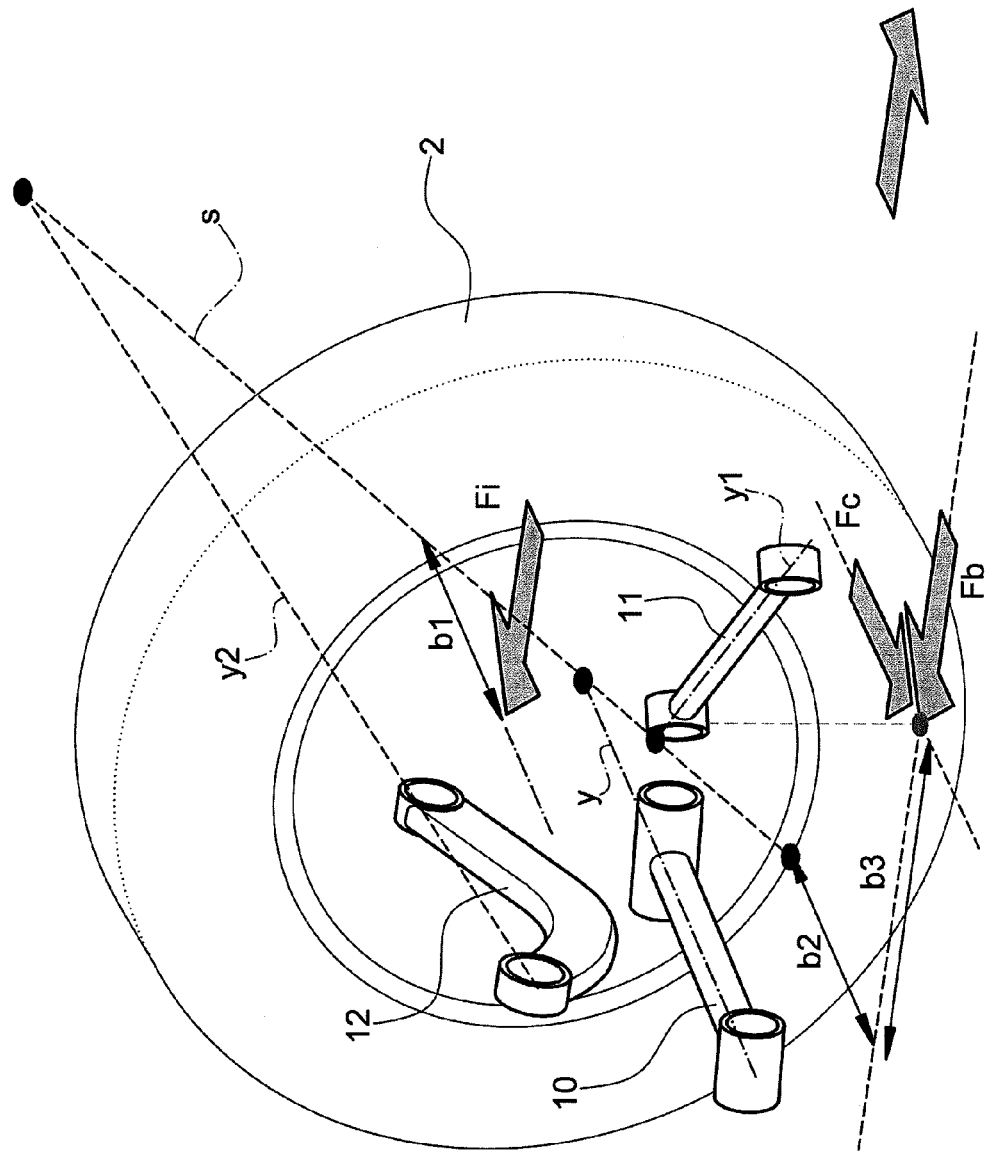

Finally, FIG. 5 shows schematically the system of forces acting on a wheel 2 connected to the vehicle structure through the suspension illustrated above, which has a shear axis s inclined to the axis y of the first connection member 10. The lever arm of the impact force Fi, of the braking force Fb and of the steering force Fc with respect to the shear axis s are indicated b1, b2 and b3, respectively. As can be appreciated, all the three forces act along a direction not passing through the shear axis s and therefore the suspension has a rather soft behaviour with respect to these forces. By varying the orientation of the shear axis, it however possible to obtain a suspension having a different elastic behaviour, complying with the required design specifications.

Naturally, the principle of the invention remaining unchanged, embodiments and manufacturing details may vary widely from those described and illustrated purely by way of non-limiting example, without thereby departing from the scope of the invention as defined in the appended claims.

For instance, it is possible to configure the three rod-like connection members forming the suspension in such a manner that not only one of them, but two of them or all of them contribute to control the remaining two degrees of freedom of the wheel-carrier, as a result of the torsional stiffness of each member about its own axis and about a direction substantially perpendicular to its own axis.

The invention claimed is:

1. Motor-vehicle independent suspension for connection of a wheel-carrier (1) of a vehicle wheel (2) to the vehicle structure, the suspension comprising a first, a second and a third connection member (10, 11, 12) each having at the one end a first point of articulation (22, 14, 16) for articulation to the wheel-carrier (1) and at the opposite end a second point of articulation (23, 15, 17) for articulation to the vehicle structure,
   wherein the first connection member (10) is a rod member arranged to control one degree of freedom of translation (t) of the wheel-carrier (1) along a first axis (y) extending in the transverse direction of the vehicle,
   wherein the second connection member (11) is a rod arranged to control one degree of freedom of translation (ti) of the wheel-carrier (1) along a second axis (yl) substantially passing through its points of articulation (14, 15),
   wherein the third connection member (12) is a rod member arranged to control one degree of freedom of translation (t2) of the wheel-carrier (1) along a third axis (y2) substantially passing through its points of articulation (16, 17), and
   wherein the first rod connection member (10) is also arranged to control the remaining two degrees of freedom of the wheel-carrier (1) by virtue of its torsional stiffness about the first axis (y) and about a direction (z) substantially perpendicular to the first axis (y).

2. Suspension according to claim 1, wherein the first rod connection member (10) is arranged to control a second degree of freedom (r1) of rotation of the wheel-carrier (1) about the first axis (y) and a third degree of freedom (r2) of rotation of the wheel-carrier (1) about a direction (z) substantially perpendicular to the first axis (y).

3. Suspension according to claim 2, wherein the first rod connection member (10) comprises an elongated central body

(21) carrying at its ends a first seat (22) for at least one first bush (24) for articulation to the wheel-carrier (1) and a second seat (23) for at least one second bush (25) for articulation to the vehicle structure.

4. Suspension according to claim 3, wherein each of said first and second seats (22, 23) of the first rod connection member (10) carries a pair of bushes (24, 25) defining a respective axis of articulation (x1, x2).

5. Suspension according to claim 3, wherein each of said first and second seats (22, 23) of the first rod connection member (10) carries only one bush (24, 25) defining a respective axis of articulation (x1, x2).

6. Suspension according to claim 4, wherein the axes of articulation (x1, x2) of the first rod connection member (10) are substantially perpendicular to the first axis (y).

7. Suspension according to claim 4, wherein the axes of articulation (x1, x2) of the first rod connection member (10) are substantially parallel to each other.

8. Suspension according to claim 3, wherein each of said first and second seat (22, 23) of the first rod connection member (10) carries a pair of bushes (24, 25) defining a respective axis of articulation (x1, x2), wherein the axes of articulation (x1, x2) of the first rod connection member (10) are substantially perpendicular to the first axis (y), and wherein the axes of articulation (x1, x2) of the first rod connection member (10) are substantially parallel to each other.

9. Suspension according to claim 3, wherein each of said first and second seats (22, 23) of the first rod connection member (10) carries only one bush (24, 25) defining a respective axis of articulation (xl, x2), wherein the axes of articulation (x1, x2) of the first rod connection member (10) are substantially perpendicular to the first axis (y), and wherein the axes of articulation (x1, x2) of the first rod connection member (10) are substantially parallel to each other.

10. Suspension according to claim 3, wherein the central body (21) of the first rod connection member (10) has a cylindrical tubular structure.

11. Suspension according to claim 3, wherein the ratio between the longitudinal size and the transverse size of the first rod connection member (10) is at least three.

* * * * *